(12) United States Patent
Kubo et al.

(10) Patent No.: US 6,624,864 B1
(45) Date of Patent: Sep. 23, 2003

(54) LIQUID CRYSTAL DISPLAY DEVICE, MATRIX ARRAY SUBSTRATE, AND METHOD FOR MANUFACTURING MATRIX ARRAY SUBSTRATE

(75) Inventors: Akira Kubo, Himeji (JP); Takaaki Kamimura, Himeji (JP); Masayuki Dojo, Himeji (JP); Kiyotsugu Mizouchi, Himeji (JP); Masahiko Machida, Himeji (JP); Shigeyuki Motokawa, Tokyo-to (JP); Tomoki Miyaji, Ibo-gun (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/293,936

(22) Filed: Apr. 19, 1999

(30) Foreign Application Priority Data

Apr. 17, 1998 (JP) .......................... 10-107896

(51) Int. Cl.⁷ ...................... G02F 1/1343; G02F 1/141; G02F 1/136
(52) U.S. Cl. .......................... 349/139; 349/123; 349/43
(58) Field of Search ............................ 349/123, 42, 43, 349/139; 257/59, 72

(56) References Cited

U.S. PATENT DOCUMENTS

| | | | | |
|---|---|---|---|---|
| 5,496,752 A | * | 3/1996 | Nasu et al. .................... 437/21 |
| 5,541,748 A | * | 7/1996 | Ono et al. .................... 349/139 |
| 5,636,042 A | * | 6/1997 | Nakamura et al. .......... 349/123 |
| 5,956,104 A | * | 9/1999 | Hayashi et al. ............... 349/43 |
| 5,995,188 A | * | 11/1999 | Shimizu et al. ............. 349/147 |
| 6,008,874 A | * | 12/1999 | Kouno et al. ................ 349/123 |

* cited by examiner

Primary Examiner—Toan Ton
(74) Attorney, Agent, or Firm—Pillsbury Winthrop LLP

(57) ABSTRACT

An object of the present invention is to simplify steps for manufacturing a matrix array substrate by reducing the number of masks being necessary to manufacture and to improve yield ratio of the matrix array substrate. According to the present invention, on a glass substrate, scanning lines, signal lines, a first insulated film, a second insulated film, an unprocessed semiconductor film, an unprocessed channel protective film, unprocessed low resistance semiconductor film, and Mo/Al/Mo laminated film are formed. Then, the source electrodes, the drain electrodes, the signal lines, a semiconductor film, and a low resistance semiconductor film are formed at a time by patterning using a common mask pattern. Display pixel electrodes cover upper surfaces of the source electrodes, the drain electrodes, the semiconductor film, the scanning line pads, and the signal line pads. Edge lines of the source electrodes, the low resistance semiconductor film, and the semiconductor film are aligned, and edge lines of the drain electrodes, the low resistance semiconductor film and the semiconductor film are aligned.

6 Claims, 13 Drawing Sheets

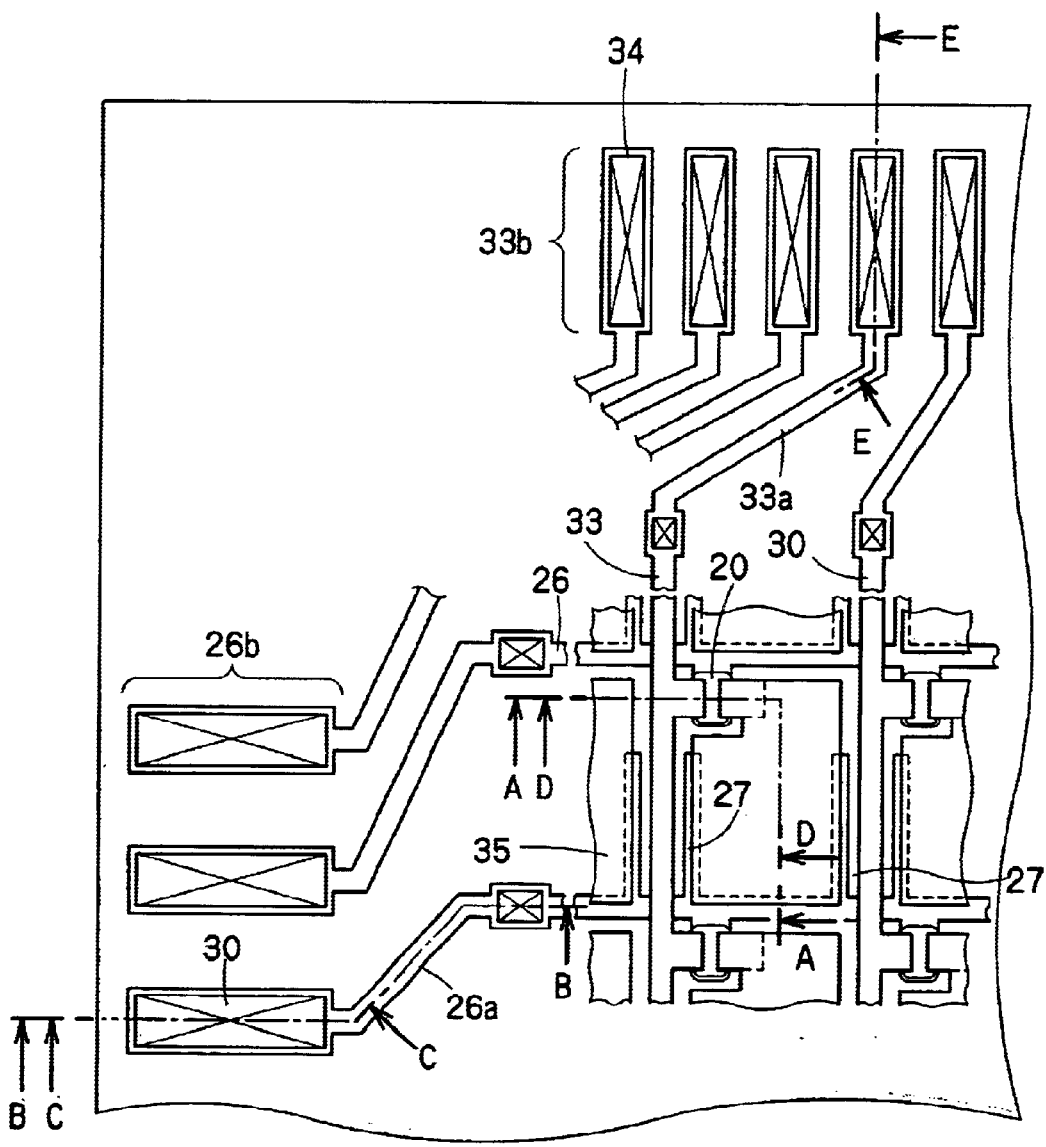
F I G. 1

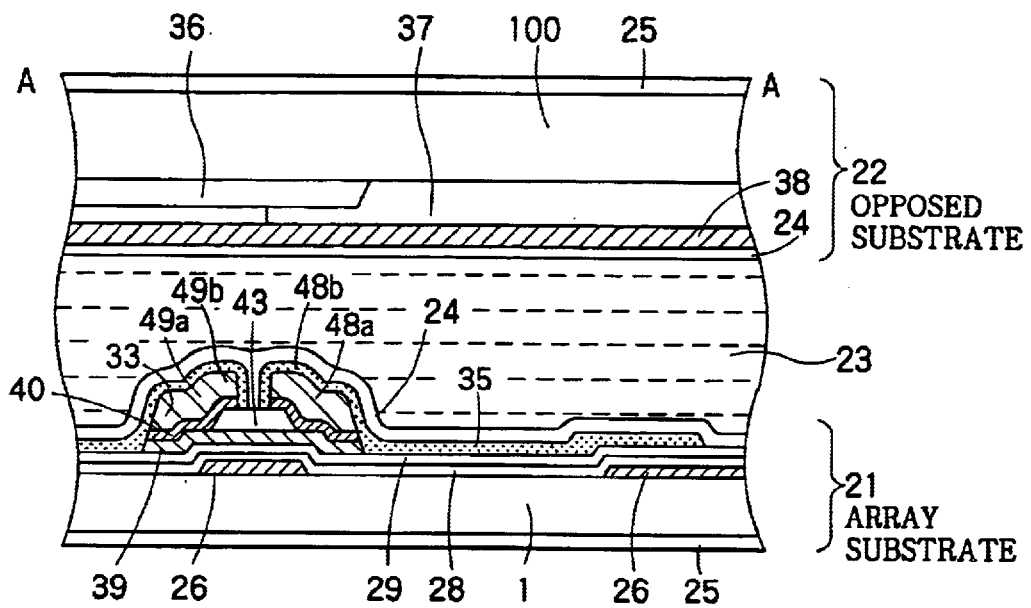
F I G. 2
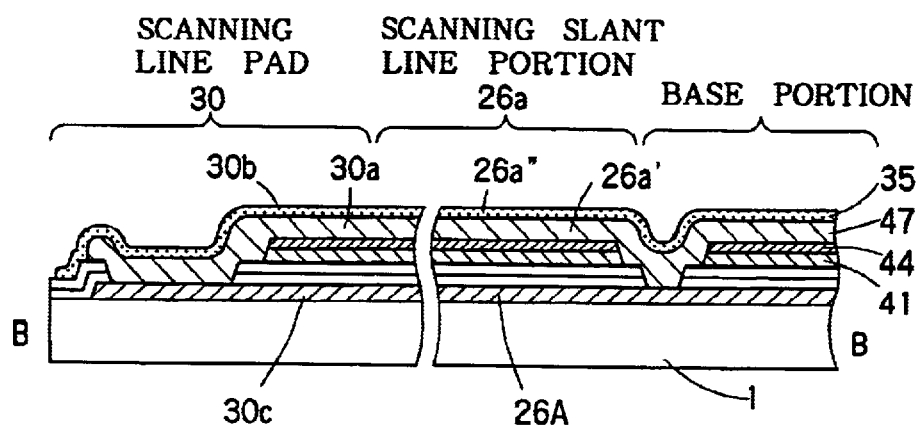
F I G. 3

TFT REGION | SCANNING LINE PAD REGION

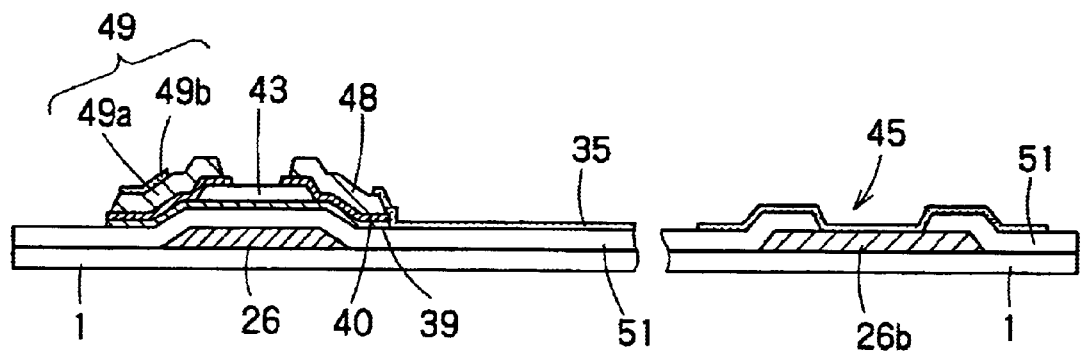
F I G. 8a
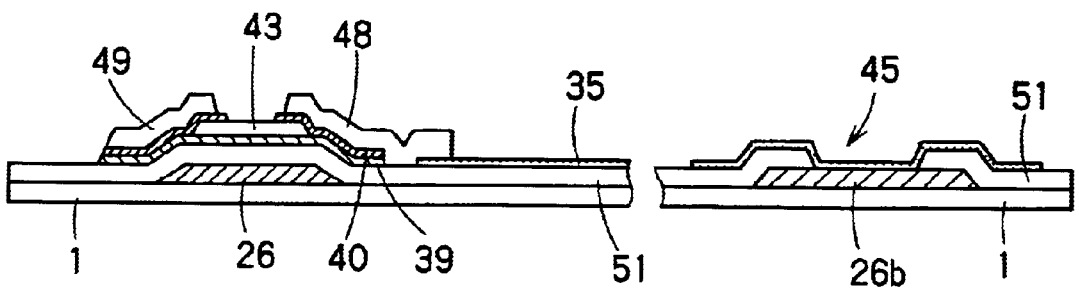
F I G. 8b

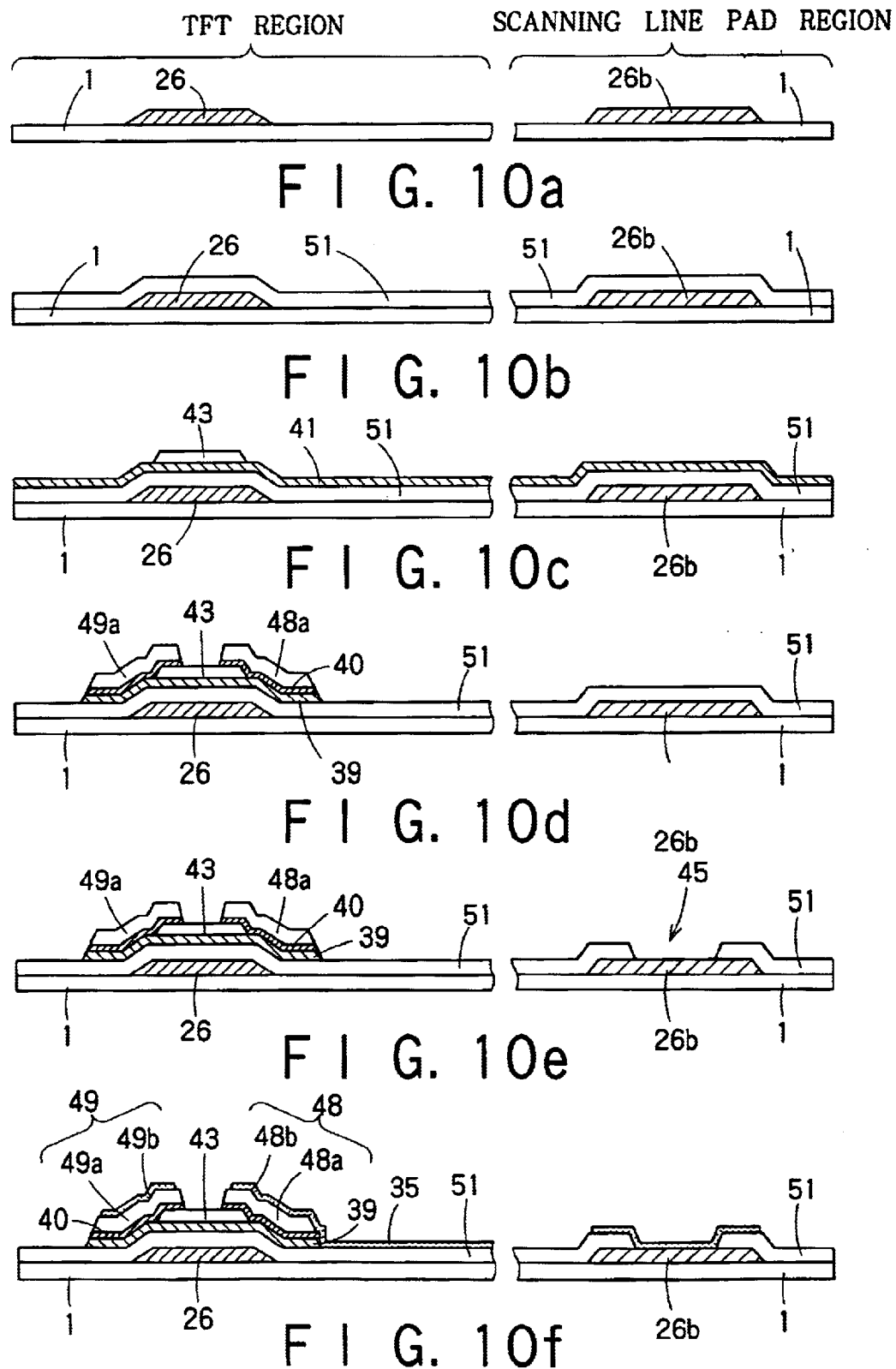

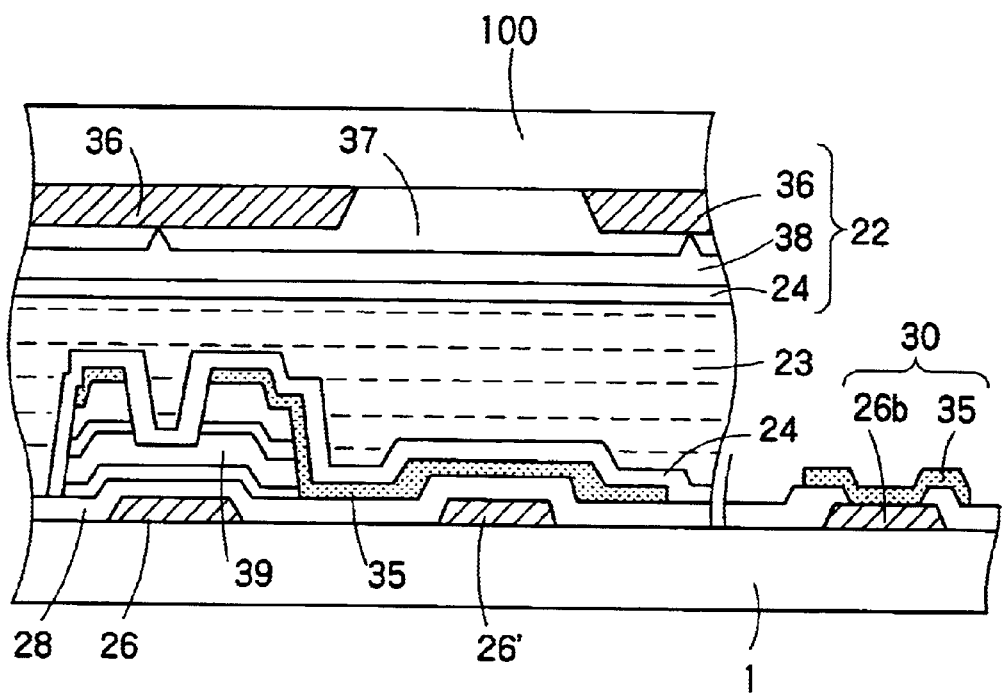
F I G. 12
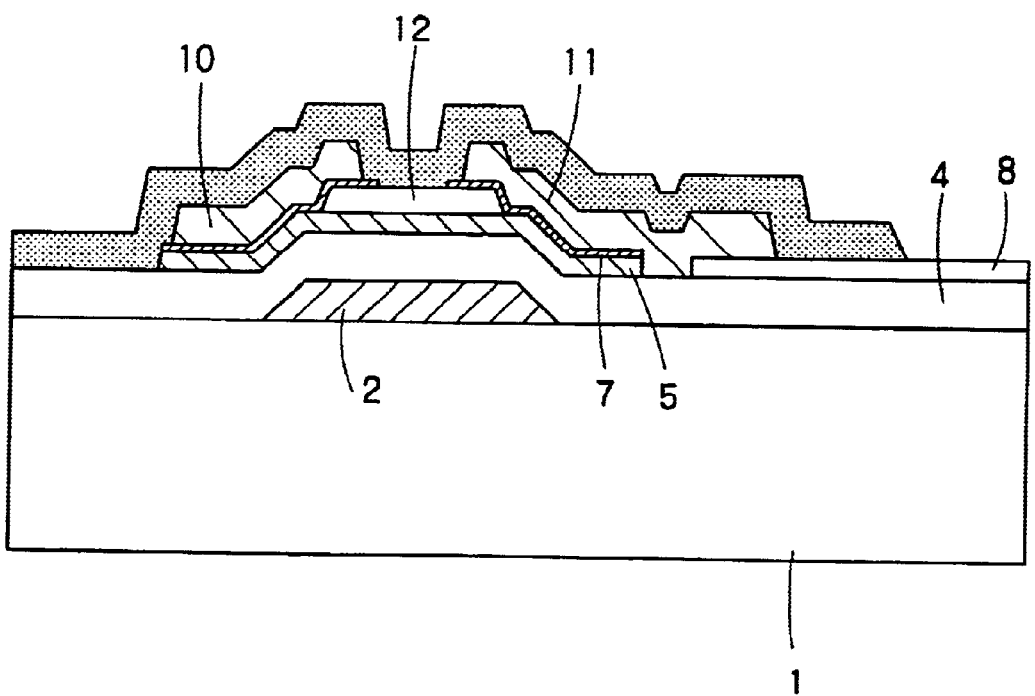
F I G. 13

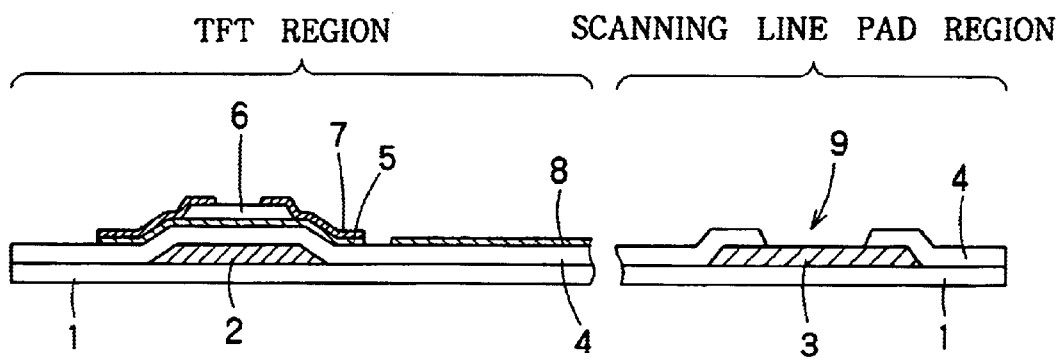
F I G. 15a
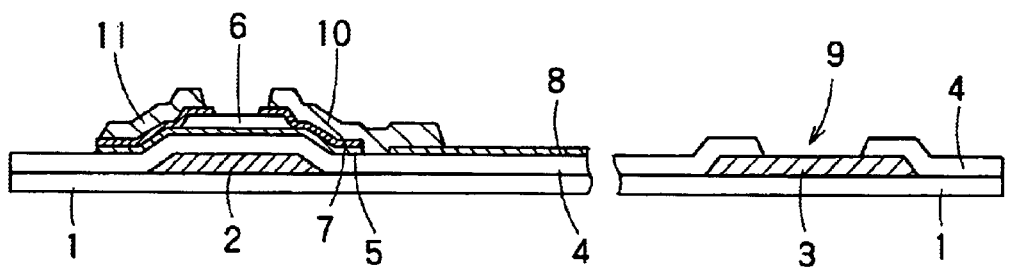
F I G. 15b
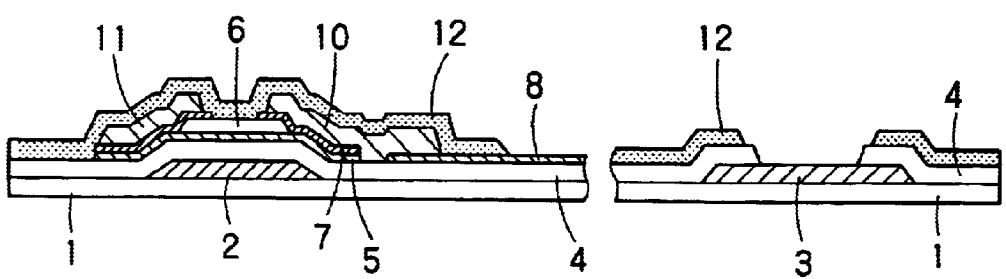
F I G. 15c

LIQUID CRYSTAL DISPLAY DEVICE, MATRIX ARRAY SUBSTRATE, AND METHOD FOR MANUFACTURING MATRIX ARRAY SUBSTRATE

BACKGROUND OF THE INVENTION

1. Field of the Invention

The present invention relates to a liquid crystal display devices, a matrix array substrate used for flat panel display devices and so on, and a method for manufacturing the matrix array substrate.

2. Related Background Art

Recently, flat panel display devices, which could replace CRT (Cathord Ray Tube) display devices, have been developed vigorously. Among the flat panel display devices, liquid crystal display (LCD) devices are lighter in weight and thinner, and consume lower power than the other flat panel display devices. Because of this, the liquid crystal display devices are especially getting a lot of attention.

Hereinafter, active matrix type of LCD devices, of which switching elements are arranged for each display pixel, will be explained. The active matrix type of LCD devices has a structure in which a liquid crystal layer is held between an array substrate and an opposed substrate, via alignment films. The array substrate comprises signal lines and scanning lines arranged in matrix form on a transparent insulating substrate such as glass and quartz, and switching elements such as TFTs (Thin Film Transistors) arranged in the vicinity of cross points of the signal lines and the scanning lines. An active layer of each TFT is formed of a semiconductor thin film such as amorphous silicon (a-Si:H).

Gate electrodes of the TFTs are connected to the scanning lines, drain electrodes of the TFTs are connected to the signal lines, and source electrodes of the TFTs are connected to display pixel electrodes made of, for instance, an ITO (Indium Tin Oxide) film.

The opposed substrate has an opposed electrode made of the ITO film formed on the transparent insulating substrate. In order to realize color display image, for instance, a color filter layer is provided between the opposed electrode of the opposed substrate and the insulating substrate.

FIG. 13 is a cross sectional view of a matrix array substrate used in the conventional LCDs, and FIG. 14a–14d and FIG. 15a–15c are diagrams illustrating manufacturing steps of a conventional array substrate. Each of FIG. 14 and FIG. 15 shows cross sectional view of TFT regions on the array substrate and scanning line pad regions. On the basis of these diagrams, the steps for manufacturing the conventional array substrates will be explained.

Fist of all, as shown in FIG. 14a, gate electrodes 2 and scanning lines 3 are formed on the glass substrate 1. Scanning pad regions are provided at the end of the scanning lines 3 and each of the scanning lines 3 is connected to the respective gate electrode 2. Next, as shown in FIG. 14b, a gate insulated film 4 is formed on the substrate 1, and then a semiconductor layer 5 made of a-Si:H is formed thereon. Next, an insulated film 6 for an etching stopper layer is formed on the semiconductor layer 5, and then the insulated film 6 is patterned.

Next, as shown in FIG. 14c, after a lower resistance semiconductor layer 7 made of $n^+$a-Si:H is formed thereon, the semiconductor layer 5 and the low resistance semiconductor layer 7 are patterned. Next, as shown in FIG. 14d, display pixel electrodes 8 are formed.

Next, as shown in FIG. 15a, contact holes 9 are formed through the gate insulated film 4 on the pad regions of the scanning lines 3. Next, as shown in FIG. 15b, source electrodes 10 and drain electrodes 11 are formed. Next, as shown in FIG. 15c, the upper surface of the substrate is covered with a passivation film except for the display pixel electrodes on the substrate and the pad regions.

In the conventional manufacturing steps shown in FIG. 14 and FIG. 15, exposure processes, development processes and patterning processes should be carried out at least seven times. As a result, it takes a long time to manufacture the LCD devices. Furthermore, because the photo-resist and the constituent materials are used in high volume, manufacturing costs become high.

By the way, Japanese Patent Laid-Open Pub. No.190571/1993 discloses manufacturing steps in which the number of patterning is reduced by using TFTs having an etching stopper layer, which thereinafter is called a channel protective TFT type. Furthermore, Japanese Patent Laid-Open Pub. No.161764/1986 discloses manufacturing steps in which the number of patterning is reduced by using the TFT (back channel cut type TFT) which has no etching stopper layer.

However, the above mentioned documents disclose only the TFT portions, and disclose no specific method for reducing all the manufacturing steps.

SUMMARY OF THE INVENTION

An object of the present invention is to provide a liquid crystal display devices, a matrix array substrate and a method for manufacturing the matrix array substrate in which it is possible to simplify a manufacturing steps by reducing the number of masks and to maintain a high productivity without lowering a yield ratio.

In order to achieve the foregoing object, a liquid crystal display device comprising:

a matrix array substrate having scanning lines including gate electrode portions arranged on an insulating substrate, a semiconductor film arranged on said gate electrode portions of said scanning lines via an insulated film, signal lines electrically connected to said semiconductor film via drain electrodes, source electrodes electrically connected to said semiconductor film, and display pixel electrodes electrically connected to said source electrodes;

an opposed substrate arranged so as to be opposite to said matrix array substrate, and a liquid crystal layer held between said matrix array substrate and said opposed substrate via respective alignment films, wherein said alignment film on the matrix array substrate directly contacts at least said display pixel electrodes and said signal lines of said matrix array substrate.

Furthermore, a matrix array substrate comprising:

scanning lines including gate electrode portions arranged on an insulating substrate;

a semiconductor film arranged on said gate electrode portions of said scanning lines via an insulated film;

signal lines electrically connected to said semiconductor film via drain electrodes;

source electrodes electrically connected to said semiconductor film, and display pixel electrodes electrically connected to said source electrodes, wherein said signal lines includes a first signal line layer mainly made of aluminum and a second line layer which is deposited on the first signal line layer and made of at least one material among tantalum (Ta), titanium (Ti), tungsten (W) and vanadium (V).

Furthermore, a method for manufacturing a matrix array substrate comprising scanning lines arranged on a substrate, thin film transistors each having an insulated film arranged on said scanning lines, a semiconductor film arranged on said insulated film, and source electrodes and drain electrodes electrically connected to said semiconductor film, signal lines electrically connected to the respective drain electrode, and display pixel electrodes electrically connected to the respective source electrode, comprising:

a first step of depositing on said insulated film an unprocessed semiconductor film and an unprocessed channel protective film in this order;

a second step of forming a channel protective film by patterning said unprocessed channel protective film;

a third step of forming openings, each of said openings corresponding to each of pads for connecting said scanning lines with external circuits, and each of said openings being formed through said unprocessed semiconductor film and said insulated film;

a fourth step of depositing a first conductive layer on the substrate, and patterning said first conductive layer and said unprocessed semiconductor layer by using a common mask pattern, in order to form a lower conductive layer of said source electrodes, drain electrodes, and signal lines at a time as well as to form said semiconductor film, and a fifth step of forming a second conductive layer on the substrate, and patterning said second conductive layer in order to form an upper conductive layer to be placed over said lower conductive layer as well as to form said display pixel electrodes.

Furthermore, a method for manufacturing a matrix array substrate comprising scanning lines arranged on a substrate, thin film transistors each having an insulated film arranged on said scanning lines, a semiconductor film arranged on said insulated film, and source electrodes and drain electrodes electrically connected to said semiconductor film, signal lines electrically connected to said drain electrodes, and display pixel electrodes electrically connected to said source electrodes, comprising:

a first step of depositing on said insulated film an unprocessed semiconductor film and an unprocessed channel protective film in this order, a second step of forming a channel protective film by patterning said unprocessed channel protective film, a third step of forming a first conductive layer on said unprocessed semiconductor film and said channel protective film, a fourth step of patterning said first conductive layer and said unprocessed semiconductor layer by using a common mask pattern, in order to form a lower conductive layer of said source electrodes, drain electrodes, and signal lines at a time as well as to form said semiconductor film, and a fifth step of forming openings on said insulated film, said openings corresponding to pads for connecting said scanning lines with external circuits, a sixth step of forming a second conductive layer on the substrate, and patterning said second conductive layer in order to form an upper conductive layer to be placed over said lower conductive layer as well as to form said display pixel electrodes.

Furthermore, a method for manufacturing a matrix array substrate comprising scanning lines arranged on a substrate, thin film transistors each having an insulated film arranged on said scanning lines, a semiconductor film arranged on said insulated film, and source electrodes and drain electrodes electrically connected to said semiconductor film, signal lines electrically connected to said drain electrodes, and display pixel electrodes electrically connected to said source electrodes, comprising:

a first step of depositing an unprocessed semiconductor film on said insulated film, a second step of forming a first conductive layer on said unprocessed semiconductor film, a third step of patterning said unprocessed semiconductor layer and said first conductive layer by using a common mask pattern, in order to form a lower conductive layer on said source electrodes, drain electrodes, and signal lines at a time as well as to form said semiconductor film, a fourth step of forming openings through said unprocessed semiconductor film and said insulated film, said openings corresponding to pads for connecting said scanning lines with external circuits, a fifth step of forming a second conductive layer on the substrate, and patterning said second conductive layer in order to form an upper conductive layer to be placed over said lower conductive layer as well as to form said display pixel electrodes.

According to the present invention, because the alignment film contacts directly the display pixel electrodes and the signal lines on the matrix array substrate, it is unnecessary to form a passivation film for protection in end step for manufacturing; accordingly, it is possible to simplify steps for manufacturing. It is unnecessary to provide a plasma CVD apparatus for forming the passivation film; accordingly, it is possible to reduce costs for manufacturing.

Furthermore, because the signal lines is composed of two layers and upper layer of the signal lines is formed of the same step as that for forming the display pixel electrodes, it is possible to further simplify steps for manufacturing.

Furthermore, because the signal lines, and the source and drain electrodes of the TFTs are formed of the first and second conductive layers, respectively, and the second conductive layer is formed of the same material as that of the display pixel electrodes, it is possible to prevent disconnect defect of the signals. When the present invention is applied to liquid crystal display devices, if the second conductive layer is formed on the upper surface of the first conductive layer, it is possible to prevent a problem in which a constituent material of the first conductive layer diffuses in the liquid crystal layer and display defect occurs.

Furthermore, according to the present invention, because the source electrodes, the drain electrodes, and the semiconductor film are formed at a time by patterning using a common mask pattern, it is possible to reduce the number of the mask patterns being necessary to manufacture the array substrate; accordingly, it is possible to reduce costs and steps for manufacturing.

Furthermore, because the number of the mask patterns being necessary for manufacturing decreases, displacement of masks hardly occurs; accordingly, it is possible to reduce fluctuation of parasite capacitors in the signal lines, the scanning lines, and the TFTs. As a result, the liquid crystal display devices of which resolution and aperture ratio are high is obtained.

BRIEF DESCRIPTION OF THE DRAWINGS

FIG. 1 is a diagram showing a layout of a first embodiment of a matrix array substrate according to the present invention;

FIG. 2 is a cross sectional view taken on A—A line of FIG. 1;

FIG. 3 is a cross sectional view taken on line B—B line of FIG. 1;

FIG. 8 is a diagram showing an example modifying the second embodiment, and a cross sectional view of a liquid crystal display devices according to a third embodiment;

FIG. 10 is a diagram showing manufacturing steps of a fifth embodiment;

FIG. 12 is a cross sectional view of the liquid crystal display devices having the array substrate according to the sixth embodiment;

FIG. 13 is a cross sectional view of the conventional array substrate;

FIG. 15 is a diagram showing manufacturing steps following to FIG. 14.

DESCRIPTION OF THE PREFERRED EMBODIMENTS

Figure 4A:
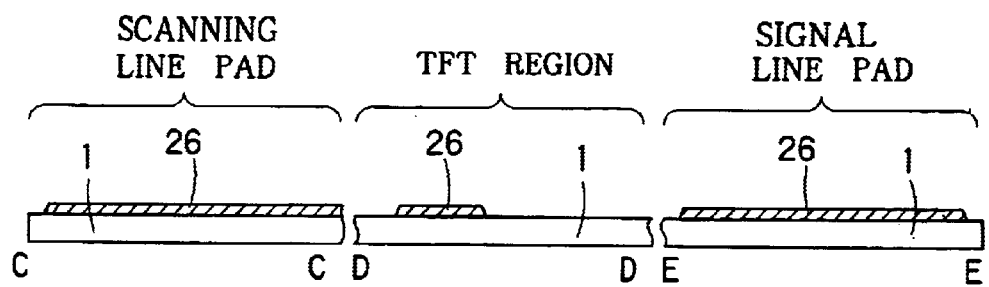
FIG. 4 is a diagram showing steps for manufacturing the array substrate according to the first embodiment.

A matrix array substrate, manufacturing method thereof, and a liquid crystal display (LCD) apparatus using the matrix array substrate will be described in detail with reference to the attached drawings as follows. Although examples of the matrix array substrate used in the LCD devices will be described hereinafter, it is possible to apply the matrix array substrate according to the present invention to the other applications such as an imaging apparatus.

First Embodiment

FIG. 1 is a diagram showing a layout of a first embodiment of a matrix array substrate according to the present invention. FIG. 2 is a cross sectional view taken on A—A line of FIG. 1, and FIG. 3 is a cross sectional view taken on B—B line of FIG. 1.

As shown in FIG. 2, the LCD devices according to the first embodiment has a structure in which an array substrate 21 and an opposed substrate 22 are oppositely arranged so as to hold a liquid crystal layer 23 via respective alignment film 24. The liquid crystal layer 23 is made of a twisted nematic liquid crystal material. The alignment films 24 are treated by rubbing in the direction being orthogonal with each other. Furthermore, polarizers 25 are affixed on outer surfaces of the array substrate 21 and the opposed substrate 22.

As shown in FIGS. 1 and 2, the array substrate 21 comprises scanning lines 26 formed on a glass substrate 1, a first gate insulated film 28, which is made of a silicon oxide (SiO$_2$) layer and formed on the scanning lines 26, and a second gate insulated film 29, which is made of a silicon nitride (SiNx) film and formed on the first gate insulated film 28. The SiO$_2$ layer constituting the first gate insulated film 28 is used for improving selectivity for etching in aftermentioned various processes. The SiNx film constituting the second gate insulated film 29 assures an excellent interface with the semiconductor film.

On the glass substrate 1, for instance, 800 members of the scanning lines 26 are formed. Each of the scanning lines 26 is connected to a connecting end 26b via a scanning slant line portion 26a. The connecting end 26b is led out of one side of the glass substrate 1. As shown in FIG. 1, scanning line pads 30 are formed at the connecting ends 26b.

Each of the scanning lines 26 has an auxiliary capacitor portion 27 and a gate electrode portion. Furthermore, as shown in FIG. 3, each of the scanning slant line portions 26a has a first conductive layer 26a', a second conductive layer 26a", and a third conductive layer 26A. Similarly, each of the scanning line pads 30 has a first conductive layer 30a, a second conductive layer 30b, and a third conductive layer 30c. The first conductive layers 26a' and 30a are formed by, for instance, a Mo/Al/Mo laminated layer. The second conductive layers 26a" and 30b are made of the same material as that of the display pixel electrodes, for instance, ITO film. The third conductive layers 26A and 30c are formed by extending the scanning lines 26.

Furthermore, the array substrate 21 has signal lines 33 arranged in the direction substantially orthogonal to the scanning lines 26. On the glass substrate 1, 1024×3 pieces, for instance, of the signal lines 33 are formed. Each of the signal lines 33 is connected to a connecting end 33b via a signal slant line portion 33a. The connecting end 33b is led out of one side of the glass substrate 1. The signal line pads 34 are formed at the connecting ends 33b.

Each of the signal lines 33, the signal slant line portions 33a, and the signal pads 34 has also the first, second and third conductive layers, as is the case with the scanning line pads 30.

Furthermore, TFTs 20 for displaying display pixels are formed at the points in the vicinity of the intersections of the scanning lines 26 and the signal lines 33. The gate electrode portions of the TFTs 20 are integrally formed with the scanning lines 26. Each of the display pixel electrode 35 is connected to the source electrode of the respective TFT 20.

On the other hand, as shown in FIG. 2, the opposed substrate 22 arranged at the opposite side to the array substrate 21 has a light shielding film 36, which is made of resin and formed in matrix form on the glass substrate 100. The light shielding film 36 shades a light which go toward the TFT regions 20, passing through a gap between the signal lines 20, the scanning lines 26 and the display pixel electrodes 35. Furthermore, color filters 37 for red (R), green (G) and blue (B) are arranged at the region opposing to the display pixel electrode 35. An opposed electrode 38 made of a transparent electrode material such as the ITO film is arranged on the color filters 37.

In the first embodiment, contact holes are formed through the signal line pads 34 so that the edge line of the signal lines 33 is aligned with each edge line of the semiconductor film 39 and the low resistance semiconductor film 40 which is formed below the signal lines 33. More specifically, in the first embodiment, the edge surfaces of the signal lines 33 are formed 0.5–2 μm inward of the edge surface of the semiconductor film 39, so that the inside wall of the contact holes becomes tapered.

Each of the signal lines 33, and the source and the drain electrodes of the TFTs 20 has a second conductive layer made of the same material as the display pixel electrode 35. Therefore, a rate of occurrence of disconnection is reduced, and display defect, which occurs as a result of diffusion of impurities toward the inside of the liquid crystal layer 2, is prevented. In the first embodiment, the second conductive layer completely covers the first conduction layer, but the second conductive layer may cover partially the upper surface of the first conductive layer. In this case, it is desirable that the second conductive layer covers more than 20% of the first conductive layer in the signal lines portion. Furthermore, in terms of prevention of short-circuit, it is desirable to make the width of the second conductive layer slightly narrower than that of the first conductive layer.

FIGS. 4a–4d and FIGS. 5a–5d are diagrams showing steps for manufacturing the array substrate 21 according to the first embodiment of the present invention. Hereinafter, with reference to these drawings, the steps for manufacturing the array substrate 21 according to the first embodiment will be described in sequence.

First of all, an Al—Nd alloy film and a Mo film are formed in this order on the glass substrate 1 by a sputter method. The film thickness of the Al—Nd alloy film is about 200 nm, and the film thickness of the Mo film is about 30 nm. Instead of the Al—Nd alloy film, the other type of Al alloy film or the Al film may be used. The Mo film prevents occurrence of hillocks on the Al film or the Al alloy film, and realize a good taper shape. It is desirable to set the thickness of the Mo film to 10–100 nm. After a resist film is coated on the Mo film and dried, an exposure process is carried out by using a first mask pattern. Next, a development process and a patterning process are carried out in sequence. Next, as shown in FIG. 4a, a first conductive layer of 800 pieces of the scanning lines 26, the scanning slant line portions 26a and the signal slant line portions 33a is formed, and at the same time, the first conductive layer of the pad portions 30 and 34 is formed.

Figure 4B:
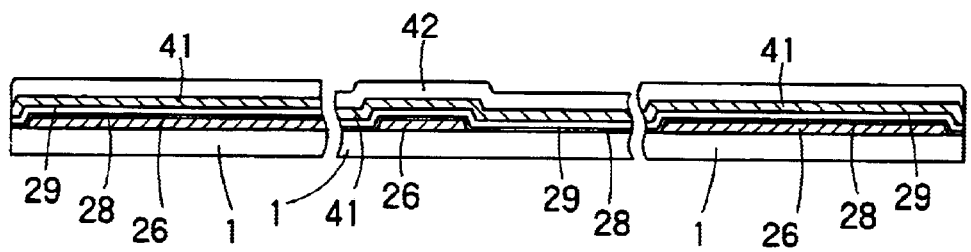

Next, as shown in FIG. 4b, by means of a low-pressure plasma CVD method, the first gate insulated film 28 made of silicon oxide in a thickness of about 300 nm, the second gate insulated film 29 made of silicon nitride in a thickness of about 50 nm, the unprocessed semiconductor film 41 made of a-Si:H in a thickness of about 50 nm, the unprocessed channel protective film 42 made of silicon nitride film in a thickness of about 200 nm are continuously formed without being exposed to air. The silicon oxide which is a constituent material of the first gate insulated film 28 is formed by two film-forming steps. That is, after a first layer made of silicon oxide is formed by the low-pressure plasma CVD method, the upper surface of the first layer is cleaned, and then a second layer made of silicon oxide is formed by the low-pressure plasma CVD method. Therefore, the rate of occurrence of a short circuit between the layers is considerably reduced. As constituent material of the unprocessed semiconductor film 41, besides a-Si:H, various silicon-base semiconductors such as poly-silicon and micro crystal silicon may be used.

Figure 4C:
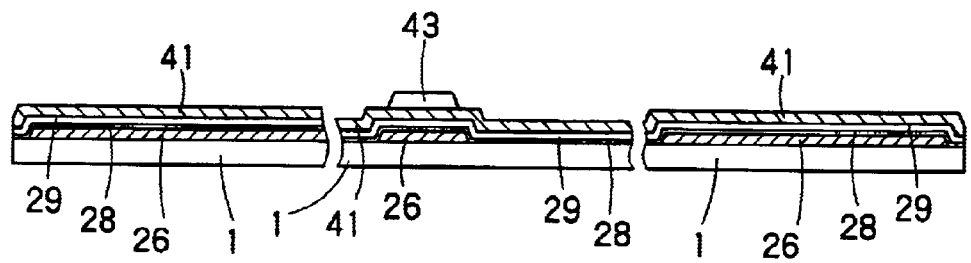

Next, a resist film is coated on the unprocessed channel protective film 42, and then dried. Next, as shown in FIG. 4c, by using the scanning lines 26 as a mask, the exposure is carried out from the rear surface of the substrate, and simultaneously, the other exposure is carried out by using a second mask pattern arranged on the substrate. Next, after the development is carried out, the unprocessed channel protective film 42 is patterned in order to form an island-shaped channel protective film 43 only at the place where the TFTs 20 will be formed.

Figure 4D:
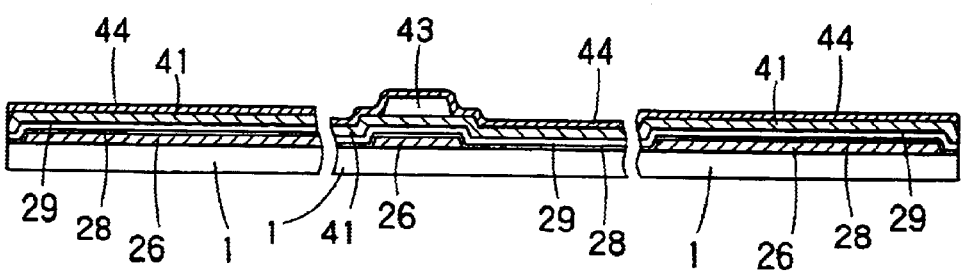

Next, as shown in FIG. 4d, in order that a good ohmic contact is obtained, the exposed surface of unprocessed semiconductor film 41 is treated with a hydrofluoric acid. Then, by means of the low-pressure plasma CVD method, an unprocessed low resistance semiconductor film 44, which is made of $n^+$a-Si:H including phosphorus as the impurity in a thickness of about 30 nm, is deposited on the unprocessed semiconductor film 41.

Figure 5A:
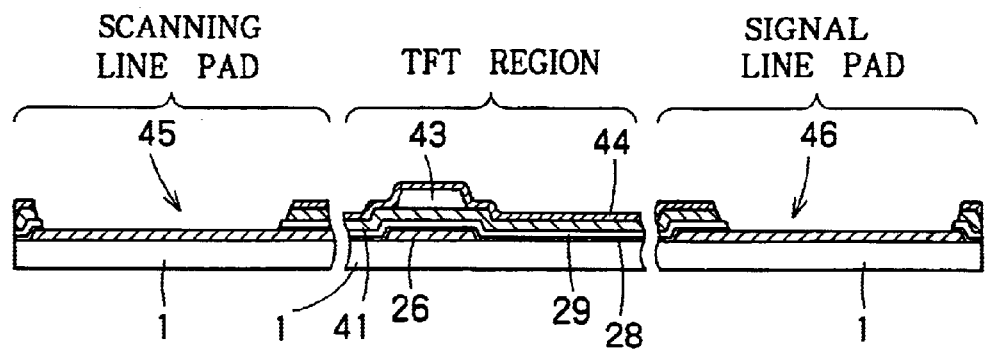
FIG. 5 is a diagram following to FIG. 4.

Next, a resist film is coated on the unprocessed low resistance semiconductor film 44 and dried. Then, as shown in FIG. 5a, after the exposure process is carried out by using a third mask pattern, the development process is carried out. Therefore, the first and second gate insulated films 28 and 29, the unprocessed semiconductor film 41, and the unprocessed low resistance semiconductor film 44 in the regions corresponding to the connecting ends 26b of the scanning lines 26 and the connecting ends 33b of the signal lines 33 are removed in order to form the contact holes 45 and 46. At this time, a dry etching such as CDE (Chemical Dry Etching) or PE (Plasma Etching) method is carried out in order to remove the unprocessed semiconductor film 41 and the unprocessed low resistance semiconductor film 44, and a wet etching using BHF (Buffered hydrofluoric acid) and so on is carried out in order to remove the first and second gate insulated films 28 and 29. Thus, by carrying out both of the dry etching and the wet etching, the contact holes 45 and 46 are formed in good tapered shape.

Figure 5B:
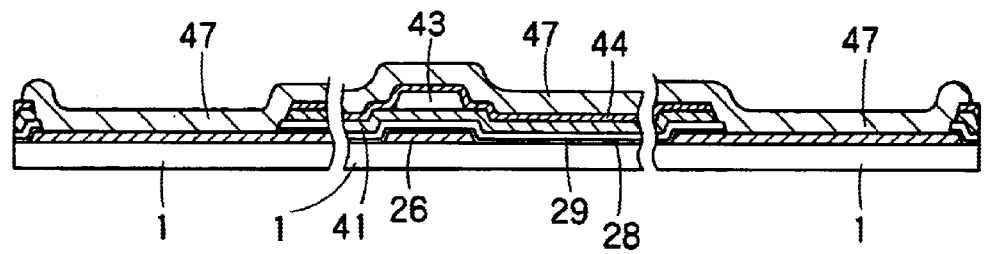

Next, as shown in FIG. 5b, a laminated film 47 consisting of an Mo (molybdenum) layer in a thickness of about 25 nm, an Al (aluminum) layer in a thickness of about 350 nm, and an Mo layer in a thickness of about 50 nm is formed by sputtering method. The lower Mo layer is formed to obtain a good ohmic contact with the unprocessed low resistance semiconductor film 44, and may be replaced with the other metal with high-melting point. Furthermore, the upper Mo layer is provided in order to reduce surface reflection and the hillocks of the Al layer. Other Al alloy such as Al—Nd may be used instead of the Al.

Figure 5C:
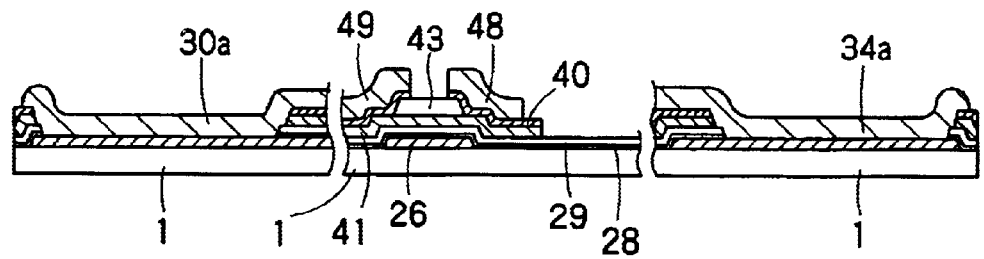

Next, a resist film is coated on the laminated film 47 and then dried. After that, as shown in FIG. 5c, the exposure process is carried out by using a fourth mask pattern, and then the development process is carried out. After that, the Mo/Al/Mo laminated film 47 is etched by using a mixed acid including phosphoric acid, nitric acid and acetic acid, while adjusting side etching amount by controlling the etching time. Furthermore, both of the unprocessed low resistance semiconductor film 44 and the unprocessed semiconductor film 41 are patterned at a time by the plasma etching method, by controlling an etching selectivity between the second gate insulated film 29 made of silicon nitride and the channel protective film 43. As a result, a semiconductor film 39 constituting an active layer of the TFTs 20, a low resistance semiconductor film 40 for obtaining a good ohmic contact, first conductive layers 48a and 49a constituting each portion of the source electrodes 48 and the drain electrodes 49, and first conductive layer 30b and 34b constituting each portion of the scanning line pads 30 and the signal line pads 34 are formed at a time.

Figure 5D:
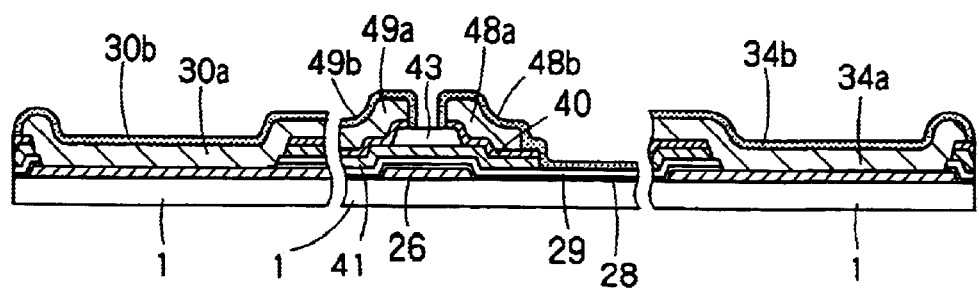

Next, as shown in FIG. 5d, an Ar gas with $H_2O$, $H_2$, or $O_2$ gas is provided on the substrate. In this embodiment, on the condition that an Ar gas with $H_2O$ gas, for instance, is provided on the substrate, the sputtering process is carried out in order to deposit an ITO film of amorphous state in a thickness of about 40 nm on the substrate. Then, after the exposure process is carried out by using a fifth mask pattern, the development process is carried out, and then the patterning process is carried out. A liquid not having etching ability of Al, for instance, oxalic acid aqua is used as an etchant of the ITO film. As the etching method of the ITO film, an RIE (Reactive Ion Etching) that uses Hl gas or $CH_4/H_2$ gas is also available.

By the above-mentioned processes, even if pin holes and so on exist on the gate insulated film, it is possible to prevent erosion and disconnection of the first conductive layer of the scanning lines 26, the scanning slant line portions 26a and the signal slant line portions 33a, and the first conductive layer of the pad portions 30 and 34. The resistance value of the ITO film at the amorphous state is lowered by carrying out a heat treatment in a later manufacturing step. Instead of the ITO film, an IZO (Indium Zinc Oxide) film may be used. If the IZO film is used, the heat treatment carried out in later manufacturing steps becomes unnecessary.

In this way, display pixel electrodes 35 are formed between the scanning lines 26 and the signal lines 33. Furthermore, the patterned ITO film corresponds to a second conductive layer constituting portions of the signal lines 33, the source electrodes 48, and the drain electrodes 49. In FIG. 5d, portions of the second conductive layer constituting the portions of the scanning line pads 30 and the signal line pads 34 are designated by the reference numerals 30a and 34a, respectively, and portions of the second conductive layer constituting the portions of the source electrodes 48 and the drain electrodes 49 is designated by the reference numerals 48b and 49b, respectively.

Next, as shown in FIG. 2, an alignment film 23 made of a polyimide is formed on the array substrate so that the film thickness after dried process is about 50 nm. Then, an opposed substrate 22, on which the alignment film 23 is formed, is arranged at the opposite side of the array substrate with a seal (not shown) to keep a predetermined interval. Then, a liquid crystal material 24 is injected between the both substrates and sealed. Furthermore, polarizing plates 25 are arranged on the outer surface of the both substrates. As a result, the liquid crystal display devices are accomplished.

Hereinafter, the steps for manufacturing the array substrate 21 of the first embodiment shown in FIGS. 4a–4d and 5a–5d will be compared with the steps for manufacturing the conventional array substrate 21 shown in FIGS. 14a–14d and 15a–15c. In the first embodiment, the contact holes 45 and 46 are formed through the connecting ends 30a and 32a of the scanning lines 30 and the signal lines 33, respectively. Next, after the Mo/Al/Mo laminated film 47 that is used as the material of the source electrodes 48 and so on is formed, the patterning process is carried out. Thus, the manufacturing steps of the first embodiment are different from the conventional manufacturing steps in that the semiconductor film 39, the low resistance semiconductor film 40, and the first conductive layer constituting portions of the source electrodes 48, the drain electrodes 49 and the signal lines 33 are formed at a time.

According to the manufacturing steps of the first embodiment, it is possible to the number of the mask patterns. That is, the manufacturing steps of the first embodiment need five mask patterns, while the conventional manufacturing steps need seven mask patterns. Furthermore, because the signal lines 33, and the source electrodes 48 and the drain electrodes 49 of the TFTs 20 are formed of the first conductive layer and the second conductive layer made of the same material as that constituting the display pixel electrodes, it is possible to prevent disconnection of the signal lines 33.

Furthermore, in the first embodiment, the edge lines of the source electrodes 48, the low resistance semiconductor film 40 and the semiconductor film 39 are aligned with the edge lines of the drain electrode 49, the low resistance semiconductor film 40 and the semiconductor film 39. More specifically, the edge lines become slightly small in the order of the semiconductor film 39, the low resistance semiconductor film 40 and the source (drain) electrodes. Because of this, when the second conductive layer is formed on the substrate at an later step, it is possible to prevent the defects such as disconnection of the second conductive layer owing to steps between these.

Furthermore, in the first embodiment, an example of forming the semiconductor film 39 by using a-Si:H has been explained. However, the semiconductor film 39 may be formed by using a poly-silicon. Furthermore, a driving circuit may be integrally formed in a peripheral region of the array substrate 21.

Furthermore, the scanning lines 26 may be formed by Al or Al alloy such as Al—Nd or Al—Y, and the gate insulated film may be formed by using only silicon nitride, and further the contact holes may be etched by only the dry etching method.

Furthermore, although the example of forming the display pixel electrodes 35 and the second conductive layer by using ITO film has been explained in FIG. 5d, the display pixel electrodes 35 and the second conductive layer may be formed by using the IZO film made of In, Zn and O. Because it is possible to form the IZO film in amorphous state and to etch the IZO film by using a weak acid such as oxalic acid, even if a metal layer with low resistance such as Al is formed under the IZO film, the metal layer does not cause electric erosion or oxidation.

Furthermore, in the first embodiment, the upper layers of the scanning line pads 30 and the signal line pads 34 are formed by using the ITO film made of the same material as the display pixel electrodes 35, and the ITO film is harder than the Al. Accordingly, even if the ITO film is unintentionally scarted when being connected to external circuits, the rate of occurrence of the short-circuit among the adjacent pads can be reduced.

Furthermore, according to the first embodiment, it is possible to reduce the number of the masks, and to directly connect the layer constituting the signal lines and the layer constituting the scanning lines by using the low resistance metal. Therefore, it is possible to connect the signal lines and the scanning lines via protective diodes which has lower contact resistances.

Furthermore, in the first embodiment, the ITO film as the second conductive layer constituting each portion of the source electrodes 48 and the drain electrodes 49 covers a region between the first conductive layers constituting each portion of the source electrodes 48 and the drain electrodes 49. As a result, it is possible to prevent the problem in that the source electrodes 48 and the drain electrodes 49 short-circuit with each other due to the influences of the undesirable conduction particles.

Second Embodiment

A second embodiment has a feature in that an order for forming the contact holes 45 and 46 in the connecting ends 26b and 31b of the scanning lines 26 and the signal lines 33 is different from that of the first embodiment.

Figure 6:
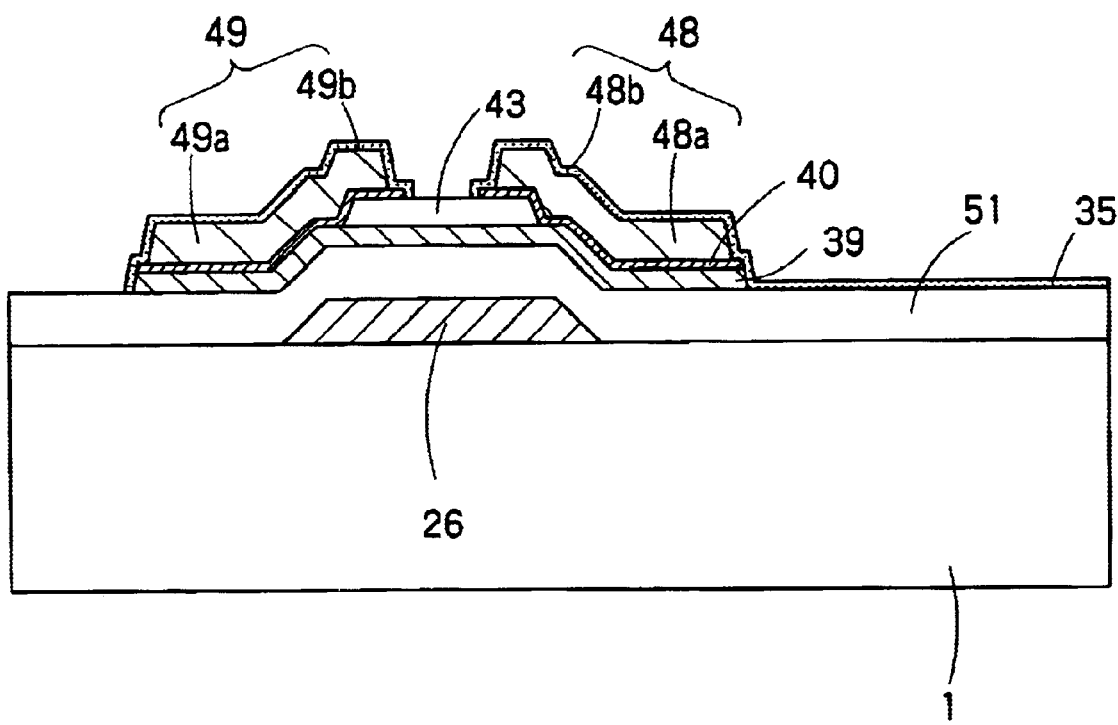
FIG. 6 is a cross sectional view of an array substrate according to a second embodiment.

FIG. 6 is a cross sectional view of an array substrate 21 according to the second embodiment. FIG. 6 shows schematically a cross sectional structure of the channel protection type of TFT block. FIG. 7 is a diagram showing manufacturing steps of the second embodiment. Hereinafter, on the basis of FIG. 7, the manufacturing steps of the second embodiment will be explained in sequence.

Figure 7A:
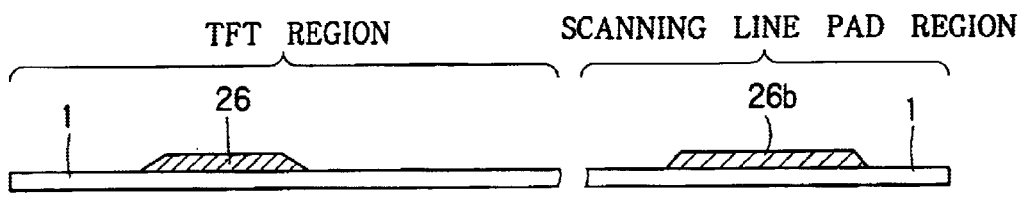
FIG. 7 is a diagram showing manufacturing steps of the second embodiment.

First of all, on the insulating substrate, for instance, the glass substrate 1, an Al alloy film in a thickness of about 300 nm is deposited by the sputter method. For instance, 2% of Nd atomic is included in the Al alloy film, in order to sufficiently reduce occurrence of the hillocks. As shown in FIG. 7a, the Al alloy film is patterned by a photolithography, in order to form gate electrode portions, supplementary capacitor portions, slant line portions (not shown) led out of one side of the substrate, and scanning lines including connecting ends 26b connected to the slant line portions. Although not shown, as the same time when forming the scanning lines, the Al alloy film is also formed as the lower wiring layer of the slant line portion of the signal lines and pad portions.

Figure 7B:
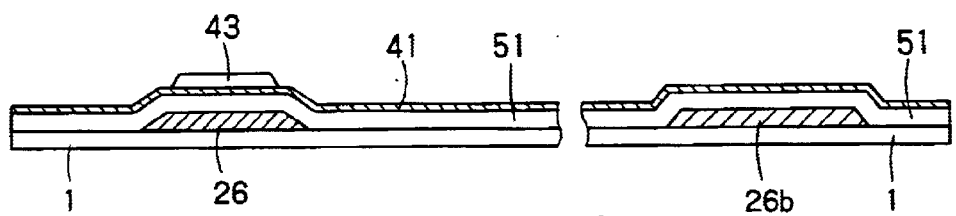

Next, as shown in FIG. 7b, by the low-pressure plasma CVD method, a gate insulated film 51 made of a silicon nitride in a thickness of about 300 nm, an unprocessed semiconductor film 41 made of a-Si:H in a thickness of about 50 nm, an unprocessed channel protective film 42 made of a silicon nitride in a thickness of about 200 nm are continuously formed without being exposed to air. The gate insulated film 51 may be replaced with a first gate insulated film made of silicon oxide in a thickness of about 300 nm and the second gate insulated film made of a silicon nitride in a thickness of about 50 nm as well as the first embodiment.

Next, the unprocessed channel protective film 44 is patterned by using a second mask pattern as well as the first embodiment, in order to form the channel protective film 43. Then, after a pre-treatment is carried out, as a contact of the source and drain electrodes 48 and 49, an unprocessed low resistance semiconductor film made of $n^+$a-Si:H in thickness of about 30 nm is deposited by the low-pressure plasma CVD method. Next, the laminated film made of the three layers of Mo/Al/Mo is deposited by the sputter method.

Figure 7C:
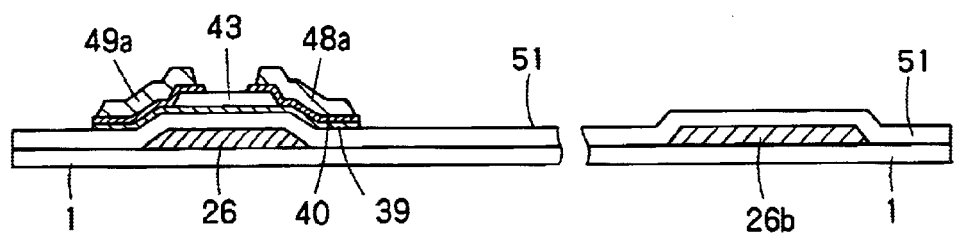
Figure 7D:
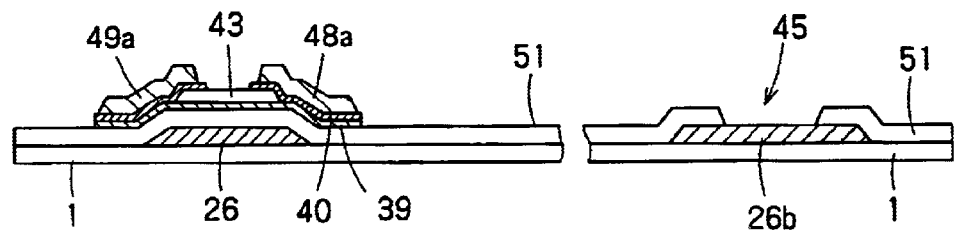

Next, as shown in FIG. 7c, the laminated layer is patterned by the photolithography using a third mask pattern, in order to form the first conductive layer 48a and 49a constituting portions of the signal lines 33, the source electrodes 48, and the drain electrodes 49. Furthermore, by using the same mask pattern, the unprocessed semiconductor film 41 and the unprocessed low resistance semiconductor film 44 are patterned by the plasma etching method, in order to form the semiconductor film 39 and the low resistance semiconductor film 40. As a result, an upper conductive layer in the signal lines 33, the source electrodes 48, the drain electrodes 49, the scanning line slant line portions 26a and the signal line slant line portions 33a is formed.

Next, as shown in FIG. 7a, by using a fourth mask pattern, the gate insulated film 51 in the region the scanning line pads 30 are formed is patterned by the plasma etching method using the gas of fluorine-base, in order to form contact holes 45.

Figure 7E:
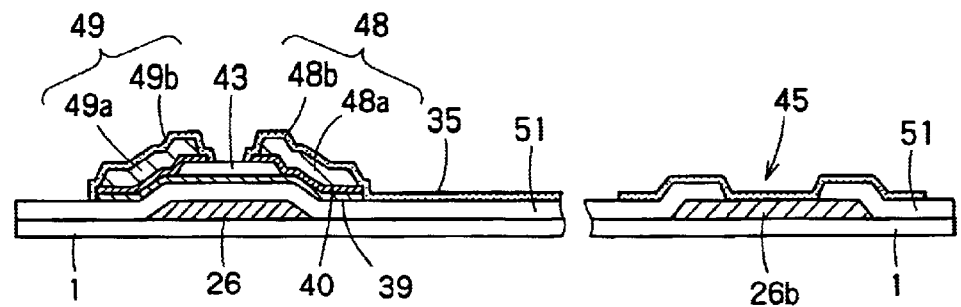

Next, as shown in FIG. 7e, by the sputtering in Ar gas including $H_2O$, $H_2$ or $O_2$ gas, for instance, Ar atmosphere including $H_2O$, the ITO film of amorphous state in a thickness of 50 nm is deposited on the substrate by maintaining temperature of the substrate relatively low. Then, the patterning is carried out by using a fifth mask pattern, in order to form the display pixel electrodes 35, the second conductive layers 48b and 49b constituting each portion of the source electrodes 48 and the drain electrodes 49, and an upper layer of the pad portions of the signal lines 33 and the scanning lines 26. As the etchant of the ITO film, the liquid that does not etch Al such as the oxalic acid is used. As the other method for patterning the display pixel electrodes 35 and the second conductive layer, the RIE of HI gas base or $CH_4/H_2$ base is also available.

Next, as is the case with the first embodiment, the alignment film is directly arranged on the ITO film 35.

Thus, in the second embodiment, the source electrodes 48, the drain electrodes 49, the low resistance semiconductor film 40 and the semiconductor film 39 are patterned by using a common mask pattern at a time, and then the contact holes for the scanning line pads 30 and the signal line pads 34 are formed. That is, although an order for forming the contact holes is different from that of the first embodiment, the other manufacturing steps is the same as the first embodiment. Accordingly, as is the case with the first embodiment, it is possible to manufacture the array substrate by the number of masks less than the conventional array substrate. Furthermore, as a material of the display pixel electrodes 35 and the second conductive layer, the IZO film is used instead of the ITO film. Because of this, as is the case with the first embodiment, it is possible to use the metal with low resistance value such as Al, as material of the scanning lines and the signal lines.

Furthermore, a mask pattern used for patterning of the ITO film shown in FIG. 7e may be changed. As shown in FIG. 8a, by patterning the ITO film, the display pixel electrodes 35 may be formed without covering the source and drain electrodes. When the wiring width of the laminated film (the first conductive layer) made of Mo/Al/Mo constituting the signal lines 33 is, for instance, 5 $\mu$m, the wiring width of the second conductive layer arranged on the first conductive layer is set to 2 $\mu$m. Therefore, even if the displacement of the mask of the second conductive layer for the first conductive layer occurs, it is possible to prevent disconnect of the signal lines 33, because the second conductive layer always locates inside the first conductive layer. Furthermore, according to the second embodiment, because it is possible to sufficiently maintain a gap between the display pixel electrodes and the second conductive layer patterned by the same mask, it is possible to prevent undesirable short-circuit between the display pixel electrodes and the second conductive layer.

In this case, in order to prevent disconnection of the signal lines 33, it is desirable to arrange a portion of the ITO film on the signal lines 33 shown in FIG. 1 as the conductive layer 49b.

Third Embodiment

Next, the other embodiment according to the present invention will be explained with reference to the attached drawings. In a third embodiment, the location where the display pixels are formed is different from that of the second embodiment. FIG. 8b is a cross sectional view of an array substrate according to the third embodiment, FIG. 9 is a diagram showing steps for manufacturing the array substrate shown in FIG. 8b.

In the third embodiment, after the steps shown in FIG. 7a–7b or FIG. 9a–9b has been carried out, the unprocessed low resistance semiconductor film, which is made of $n^+$a-Si:H in a thickness of about 50 nm, is formed by the low-pressure plasma CVD method. Then, the CDE is carried out by using a gas including $CF_4$ and $O_2$, in order to pattern the unprocessed semiconductor film 41 and the unprocessed low resistance semiconductor film. More specifically, in order that the unprocessed semiconductor film 41 and the unprocessed low resistance semiconductor film 44 remain to the regions where the TFTs and the signal lines are formed, the unprocessed semiconductor film 41 and the low resistance semiconductor are patterned by using a third mask pattern.

Next, the ITO film is deposited by the sputter method. More specifically, a sintered ITO film target in which a weight ratio (%) of $In_2O_3$ and $SnO_2$ is 90:10, is used to carry out the sputter in which a partial pressure of Ar is set more than or equal to 0.4 Pa. In this case, instead of Ar, even if Kr is used, a good result is obtained. The partial pressure of $H_2O$ is set to $3.4*10^{-3}$ Pa, for instance. Instead of $H_2O$, $O_2$ may be used. The temperature of the substrate is set to a room temperature. That is, a plate temperature for supporting the substrate is set to 60° C., for instance. When the plate temperature is within the range from the room temperature to 200° C., the quality of ITO film is sufficiently amorphous.

A power density of the ITO film is more than or equal to 7.0 W/cm². A sweep reciprocating of a magnet is more than or equal to one time, from the sweep start till the sweep end coming back an original location. It is desirable to set less than 80 nm a thickness of the ITO film. It is desirable to set a time for forming the ITO film within the range from 20 second to 60, in order to restrain a crystallization of the ITO film.

Figure 9A:
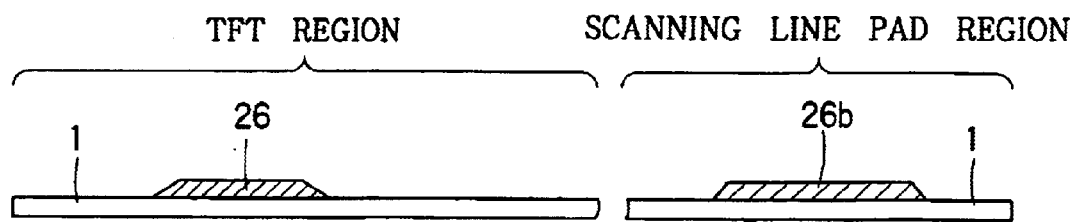
FIG. 9 is a diagram showing manufacturing steps of a fourth embodiment.
Figure 9B:
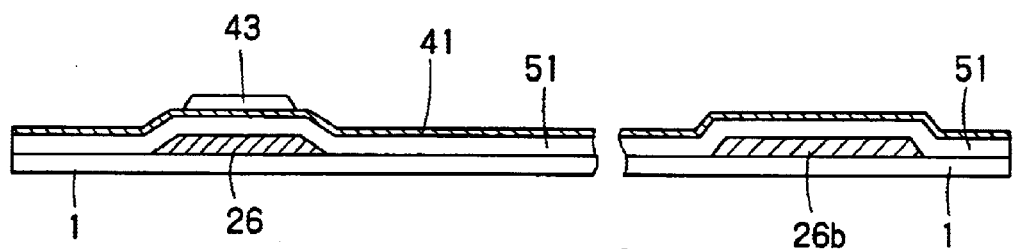
Figure 9C:
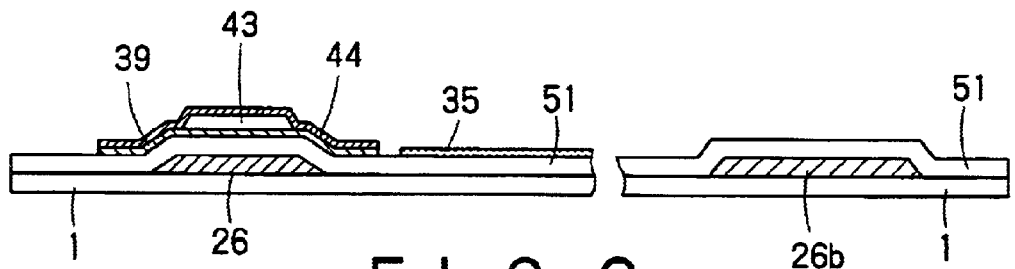

Next, the ITO film is patterned by using the fourth mask pattern. More specifically, a resist film is coated on the ITO film in order to pattern the ITO film. Then, after an outside portion of a patterned area is removed by using a wet etchant which includes at least more than or equal to weight ratio 1% of $(HCOOH)^2$, for instance, 3.4%, the resist film is exfoliated by using an alkaline liquid with high concentration, as shown in FIG. 9c.

Next, the heat treatment is carried out on the purpose of allowing a transmittance of the ITO film 35 to arise on the average. In this case, the condition of the atmosphere is an atmospheric pressure in a nitride gas. For instance, if the temperature of the substrate is more than or equal to 230° C., and the treatment time is longer than or equal to 5 minutes, the ITO film is sufficiently applicable, because the transmittance becomes considerably higher than 80%.

Figure 9D:
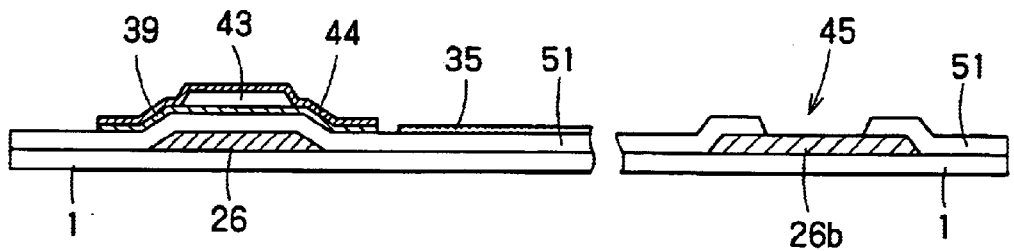

Next, after the exposure, the development and the patterning is carried out by using a fifth mask pattern, the gate insulated film 51 is eliminated by the plasma etching method using a gas including fluorine, in order to form the contact holes 45, as shown in FIG. 9d.

Next, the Mo layer is deposited in a thickness of about 25 nm by the sputter method. By using a target composed of Al including 2.0 atomic percent of a neodymium, and using Ar gas or Kr gas, the pressure of which is controlled to less than or equal to 1.3 Pa and the power of which is controlled to less than or equal to 40 kW, the Al—Nd alloy layer is deposited in a thickness of about 350 nm by the sputter method. On the Al—Nd alloy layer, the Mo layer is formed in a thickness of about 50 nm by the sputter method. In this case, instead of the Al—Nd alloy layer, Al, Al—Y or Al—Gd may be used. A tapered shape of the wiring portion after the etching process changes in accordance with combination of materials used for the sputter and the film thickness.

Figure 9E:
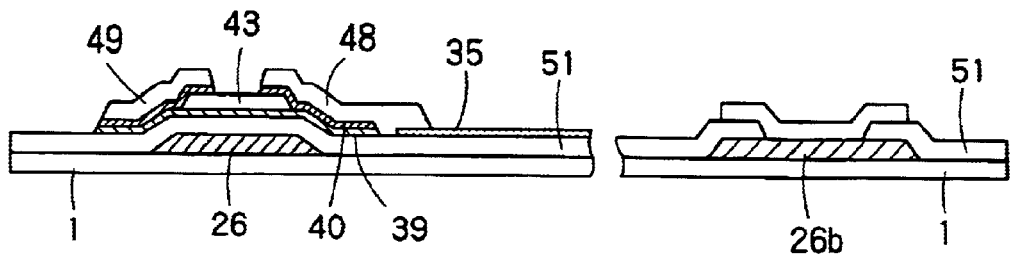

Next, after the resist film is exposed and developed by using a sixth mask pattern, the laminated film is patterned by the wet etching that uses a mixed acid including phosphoric acid, nitric acid and acetic acid, in order to form the signal lines not shown, the source electrodes 48 and the drain electrodes 49. At the same time, the unprocessed low resistance semiconductor film on the channel protective film 43 is removed by the plasma etching method and so on by using the source electrodes 48 and the drain electrodes 49 as a mask. By the above-mentioned steps, as shown in FIG. 9e, the array substrate is obtained.

Thus, in the third embodiment, because the ITO film is not formed on the source electrodes 48 and the drain electrodes 49, even if a step is formed between the source electrodes 48 and the drain electrodes 49, it is possible to prevent disconnect of the ITO film. As a result, it is possible to allow the drain electrodes 49 and the display pixel electrodes 35 to surely conduct.

Fourth Embodiment

In the first through third embodiments, as a material of the lower conductive layer of the source electrodes 48 and the drain electrodes 49 of the TFTs, the laminated film 47 made of Mo/Al/Mo is used. The material of the uppermost layer of the laminated film is Mo. The Mo easily melts by lye or water and changes to oxide which attaches to the substrate again. The oxide $MoO_2$ of the Mo has a resistivity of about 88 μ·cm in a bulk. Accordingly, when the voltage is applied to the electrodes for a long time, the uppermost layer of which is made of Mo, the source electrodes 48 and the drain electrodes 49 short-circuit partially via the oxide of Mo; as a result, the leak current occurs between the source electrodes 48 and the drain electrodes 49.

In after-mentioned fourth and Fifth embodiments, a metal, an oxide of which has a high resistivity, for instance, vanadium (V) is used, in order to reduce a leak current between the source electrodes 48 and the drain electrodes 49.

Hereinafter, along the above-mentioned third embodiment, the fourth embodiment will be explained with reference to FIG. 9.

First of all, on a transparent glass substrate 1 on which the $SiO_2$ film is formed by the plasma CVD method, a MoW film is deposited in a thickness of about 300 nm by the sputter method. Next, the exposure, the development and a first patterning is carried out by using a first mask pattern. Next, after a CDE (Chemical Dry Etching) is carried out by using a gas including $CF_4$ and $O_2$, the MoW film is worked on so that a taper less than or equal to 35° is formed, in order to form the gate electrode, as shown in FIG. 9a.

Next, as a gate insulated film 51, an silicon oxide film in a thickness of about 300 nm and a silicon nitride film in a thickness of about 50 nm are deposited by the low-pressure plasma CVD method. Furthermore, an unprocessed semiconductor film 41 made of a-Si:H film in a thickness of about 50 nm and an unprocessed channel protective film not shown made of a silicon nitride film in a thickness of about 300 nm are continuously deposited to four layers without being exposed to air. As is the case with the above-mentioned embodiments, a unprocessed channel protective film is patterned by the exposure from a rear surface and a second patterning as well as the above-mentioned embodiment, in order to form the channel protective film 43 above the gate electrode 26, as shown in FIG. 9b.

Next, an unprocessed low resistance semiconductor film made of n⁺a-Si:H is formed in a thickness of about 50 nm by the reducing plasma CVD. After that, the CDE is carried out by using a gas including CF4 and $O_2$, in order to pattern the unprocessed low resistance semiconductor film. More specifically, the unprocessed low resistance semiconductor film is patterned so that the unprocessed low resistance semiconductor film remains to regions for forming the TFTs and regions for forming the signal lines.

Next, the ITO film is deposited by the sputter method. More specifically, a sintered ITO film target in which a weight ratio (%) of $In_2O_3$ and $SnO_2$ is 90:10, is used to carry out the sputter in which a partial pressure of Ar is set more than or equal to 0.4 Pa. In this case, instead of Ar, even if Kr is used, a good result is obtained. The partial pressure of $H_2O$ is set to $3.4*10^{-3}$ Pa, for instance. Instead of $H_2O$, $O_2$ may be used. The temperature of the substrate is set to a room temperature. That is, a plate temperature for supporting the substrate is set to 60° C., for instance. When the plate temperature is within the range from the room temperature to 200° C., the quality of ITO film is sufficiently amorphous.

A power density of the ITO film is more than or equal to 7.0 W/cm2. A sweep reciprocating of a magnet is more than or equal to one time, from the sweep start till the sweep end coming back an original location. It is desirable to set less than 80 nm a thickness of the ITO film. It is desirable to set a time for forming the ITO film within the range from 20 second to 60, in order to restrain a crystallization of the ITO film.

Next, the ITO film is patterned by using the fourth mask pattern. More specifically, a resist film is coated on the ITO film in order to pattern the ITO film. Then, after an outside portion of a patterned area is removed by using a wet etchant which includes at least more than or equal to weight ratio 1% of $(HCOOH)^2$, for instance, 3.4%, the resist film is exfoliated by using an alkaline liquid with high concentration, as shown in FIG. 9c.

Next, the heat treatment is carried out on the purpose of allowing a transmittance of the ITO film 35 to arise on the average. In this case, the condition of the atmosphere is an atmospheric pressure in a nitride gas. For instance, if the temperature of the substrate is more than or equal to 230° C., and the treatment time is longer than or equal to 5 minutes, the ITO film is sufficiently applicable, because the transmittance becomes considerably higher than 80%.

Next, as shown in FIG. 9d, the gate insulated film 51 of the pad portions is removed by using a fourth mask pattern, in order to form contact holes 45.

Next, the Mo layer is deposited in a thickness of about 25 nm by the sputter method. By using a target composed of Al including 2.0 atomic percent of a neodymium, and using Ar gas or Kr gas, the pressure of which is controlled to less than or equal to 1.3 Pa and the power of which is controlled to less than or equal to 40 kW, the Al—Nd alloy layer is deposited in a thickness of about 350 nm by the sputter method. On the Al—Nd alloy layer, by using a target composed of vanadium, and using Ar gas or Kr gas, the pressure of which is controlled to less than or equal to 1.3 Pa and the power of which is controlled to less than or equal to 15 kW, a vanadium layer is deposited in a thickness of about 50 nm by the sputter method. In this case, instead of the Al—Nd alloy layer, Al, Al—Y or Al—Gd may be used. As a material of the lowermost layer of the laminated film, vanadium may be used instead of Mo. A tapered shape of the wiring portion after the etching process changes in accordance with combination of materials used for the sputter and the film thickness.

Next, after the resist film is exposed and developed by using a fifth mask pattern, the laminated film is patterned by the wet etching that uses a mixed acid including phosphoric acid, nitric acid and acetic acid, in order to form the signal lines not shown, the source electrodes 48 and the drain electrodes 49. At the same time, the unprocessed low resistance semiconductor film on the channel protective film 43 is removed by the plasma etching method and so on by using the source electrodes 48 and the drain electrodes 49 as a mask. By the above-mentioned steps, as shown in FIG. 9e, the array substrate is obtained.

Thus, in the fourth embodiment, because the uppermost layer 47c of the source electrodes 48 and the drain electrodes 49 of the TFTs is formed of vanadium, it is possible to reduce the leak current flowing between the source electrodes 48 and the drain electrodes 49, and electric properties of the TFTs are improved. If vanadium is used for the uppermost layer 47c, it is possible to prevent diffusion to the liquid crystal layer 23 of the materials in the lower conductive layer, such as aluminum.

Fifth Embodiment

In a fifth embodiment, an order for forming the ITO film 35 is different from that of the fourth embodiment. In the fifth embodiment, the ITO film 35 covers the upper surface of the source electrodes 48 and the drain electrodes 49 of the TFTs.

FIG. 10 is a diagram showing steps for manufacturing an array substrate according to the fifth embodiment. Hereinafter, the steps for manufacturing an array substrate according to the fifth embodiment will be explained with reference to FIG. 10.

After a MoW film is formed on a transparent glass substrate 1 on which a SiOx film is attached, the MoW film is worked on a tapered shape by patterning on the basis of a first mask pattern, in order to form gate electrodes, as shown in FIG. 10a. Next, as shown in FIG. 10b, the gate insulated film 51 is deposited on the MoW film.

Next, after an unprocessed semiconductor film 41 is formed on the gate insulated film 51, a silicon nitride film acting on as an unprocessed channel protective film is formed. Next, as shown in FIG. 10c, the unprocessed channel protective film is patterned on the basis of a second mask pattern, in order to form a channel protective film 43.

The above-mentioned steps is the same as the fourth embodiment. In the fifth embodiment, on the channel protective film, an unprocessed low resistance semiconductor film and a laminated film made of Mo/Al—Nd/V are formed in sequence. Then, as shown in FIG. 10d, the laminated film, the unprocessed low resistance semiconductor film and the unprocessed semiconductor film 41 are patterned at a time by patterning on the basis of a third mask pattern.

Then, as shown in FIG. 10e, the gate insulated film 51 of pad portions is removed based on a fourth mask pattern, in order to form contact holes 45. Then, after the ITO film is deposited by the sputter method, the patterning is carried out by using a fifth mask pattern, in order to form the display pixel electrodes 35, as shown in FIG. 10f.

Thus, in a fifth embodiment, because the ITO film 35 covers the upper surface of the source electrodes 48 and the drain electrodes 49 of the TFTs, it is possible to protect both electrodes by the ITO film 35. Accordingly, a passivation film for protection becomes unnecessary, and it is possible to simplify the steps for manufacturing. Furthermore, as is the case with the fourth embodiment, because the uppermost layer 47c of the lower conductive layer of the source electrodes 48 and the drain electrodes 49 is formed of vanadium, it is possible to prevent a problem in which a portion of the lower conductive layer diffuses in the liquid crystal layer 23. It is possible to reduce a leak current flowing between the source electrodes 48 and the drain electrodes 49.

Sixth Embodiment

In the first through fifth embodiments, the matrix array substrate, which uses so called channel protective film type of TFTs and arranges the channel protective film above the gate electrodes, has been explained. Instead of the channel protective film type of TFTs, back channel type of TFTs may be used as switching elements of the matrix array substrate. It is possible to further reduce times of patterning by using the back channel type of TFTs.

FIG. 11 is a diagram showing steps for manufacturing an array substrate according to a sixth embodiment. Hereinafter, the steps for manufacturing the array substrate according to the sixth embodiment will be explained with reference to FIG. 11.

Figure 11A:
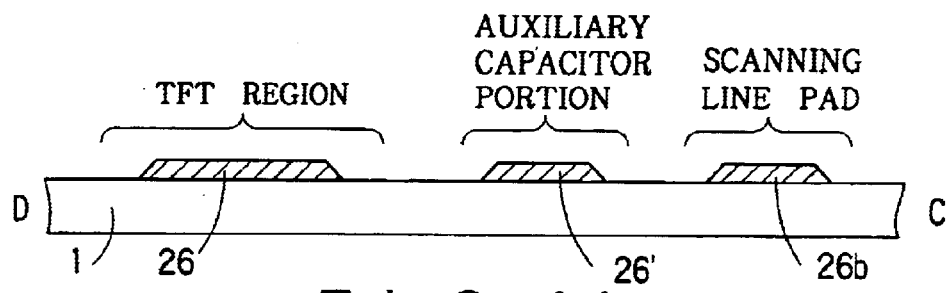
FIG. 11 is a diagram showing manufacturing steps of a sixth embodiment.

First of all, a MoW alloy film in a thickness of about 230 nm is laminated on the glass substrate 1 by the sputter method. The exposure, the development, and a first patterning are carried out by using a first mask pattern. As shown in FIG. 11a, 480 pieces of the scanning lines 26 and 480 pieces of the auxiliary capacitor lines 26' including connecting ends led out of an one side of the glass substrate are formed.

Figure 11B:
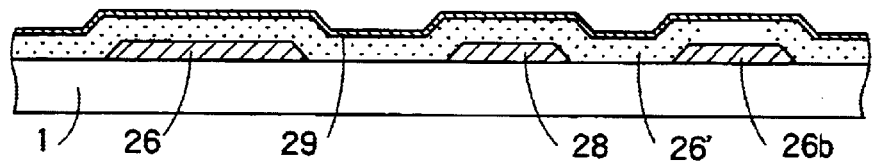

Next, after a first gate insulated film 28 made of silicon oxide is deposited in a thickness of about 350 nm, a second gate insulated film 29 made of a silicon nitride is formed in a thickness of about 50 nm, as shown in FIG. 11b. Next, an unprocessed semiconductor film made of a-Si:H in a thickness of about 250 nm and an unprocessed low resistance semiconductor film made of n$^+$a-Si:H in a thickness of about 50 nm, which includes phosphorus as an impurity, are continuously formed without be exposed to air. After that, Mo/Al/Mo laminated film 47a, 47b and 47c in a thickness of 25 nm, 350 nm and 50 nm, respectively is deposited by the sputter method.

Figure 11C:
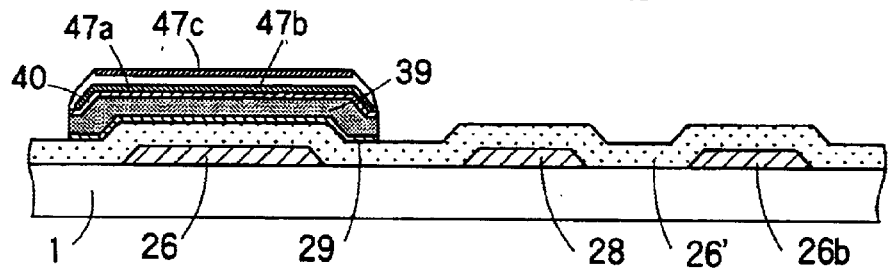

Next, as shown in FIG. 11c, the Mo/Al/Mo laminated film 47a, 47b and 47c, the unprocessed low resistance semiconductor film, the unprocessed semiconductor film and a second gate insulated film 29 made of a silicon nitride film are patterned at a time by using a second mask pattern, in order to form regions of the signal lines and regions of the TFTs in an island shape. More specifically, the Mo/Al/Mo laminated film 47 is wet-etched by using a mixed acid including the phosphorous acid, the nitric acid and the acetic acid. Then, the unprocessed low resistance semiconductor film, the unprocessed semiconductor film and the gate insulated film 29 are patterned at a time by a plasma etching using a $SF_6/O_2/HCl$ gas, in order to form a low resistance semiconductor film 40 and a semiconductor film 39.

Figure 11D:
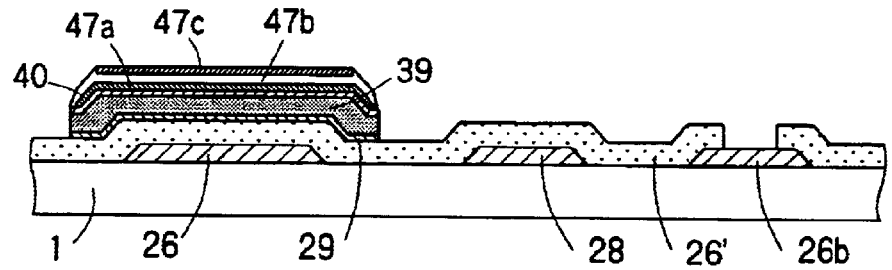

Next, after the exposure and the development are performed by using a third mask pattern, as shown in FIG. 11d, a third patterning is carried out by a wet etching using a BHF, in order to form contact holes 45 on the scanning line pads.

Figure 11E:
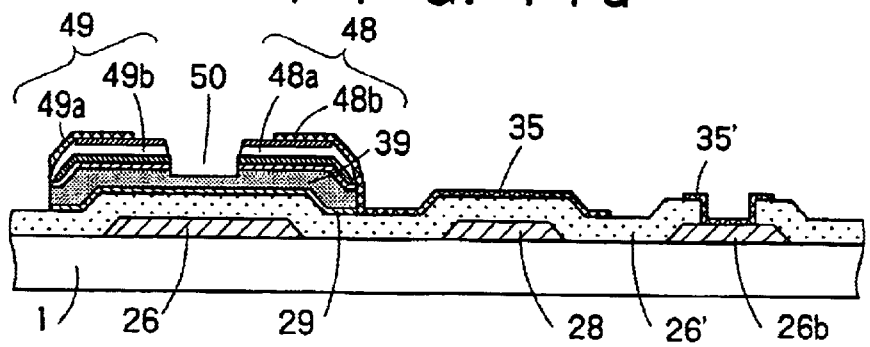
Figure 14A:
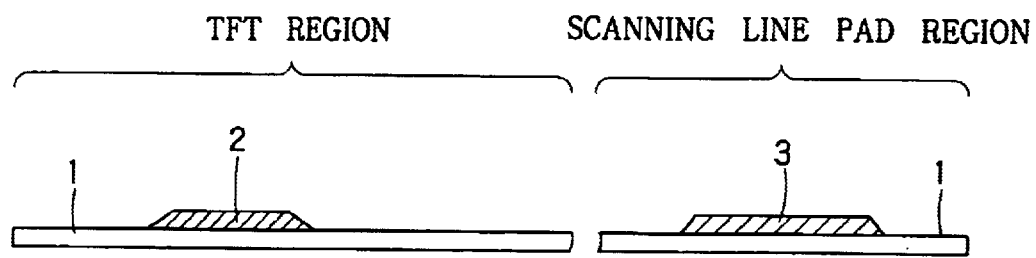
FIG. 14 is a diagram showing steps for manufacturing the conventional array substrate.
Figure 14B:
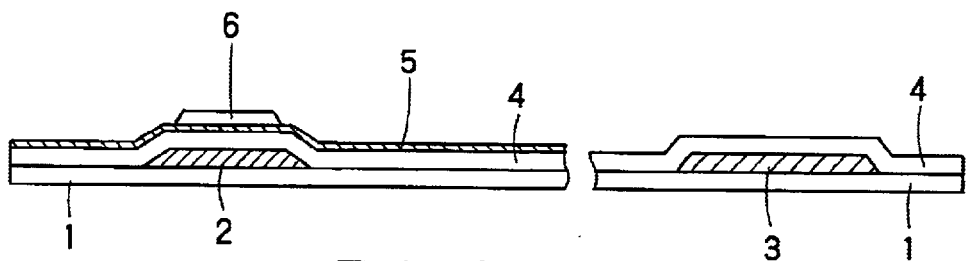
Figure 14C:
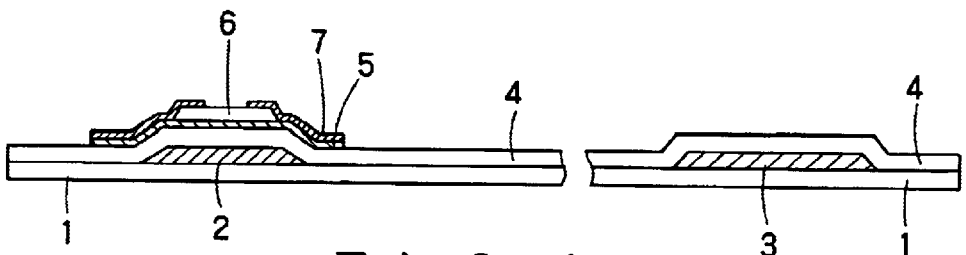
Figure 14D:
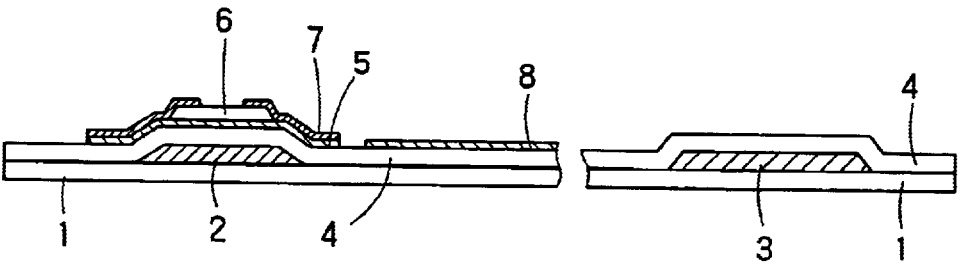

Next, on the condition that the temperature of the substrate is set to less than or equal to 150° C., and $H_2O$ gas is provided, an ITO film in a thickness of about 40 nm is formed on the substrate by the sputter method. Next, after the exposure and the development are carried out by using a fourth mask pattern, the source electrodes 48 and the drain electrodes 49 of the TFTS, and the display pixel electrodes are formed. Then, the source electrodes 48 and the drain electrodes 49 are separated with each other by using, for instance, wet etching. At the same time, as shown in FIG. 11e, the unprocessed low resistance semiconductor film is etched in order to form a back channel portion 50.

3% oxalic acid including an interfacial active agent is used in order to etch the ITO film 35. In terms of the back channel portion 50 of the TFTs, after the Mo/Al/Mo laminated film 47 is removed by a mixed acid including phosphorous acid, nitric acid and acetic acid, the unprocessed low resistance semiconductor film is etched by SF6/HCl, in order to separate the source electrodes 48 from the drain electrodes 49.

Next, the heat treatment of about 230° C. and about 30 minutes is carried out. As a result, the ITO film converts from an amorphous state to poly-crystal state, and simultaneously, properties of TFTs become steady. At the same time, at the place where the contact holes 45 are formed, a signal line connecting pads 34, which are made of the same material as the display pixel electrodes 35 and connected electrically to the signal lines 33, is formed.

After patterning the ITO film 35, the resist is exfoliated, and then the ITO film is converted from the amorphous state to the micro crystal state, and then Mo/Al/Mo laminated film 47 and the low resistance semiconductor film may be patterned by using the ITO film as a mask.

Next, an alignment film 24 is formed on the ITO film 35. By the above-mentioned steps, the array substrate is accomplished. Next, the array substrate is affixed to an opposing substrate on which an alignment film 24 is formed, by sandwiching a liquid crystal layer between both substrates. As a result, liquid crystal display devices are accomplished.

Thus, in seven embodiment, the Mo/Al/Mo laminated film, the unprocessed low resistance semiconductor film and the unprocessed semiconductor film are patterned at a time, in order to form regions for the signal lines and regions for the TFTs. Furthermore, in the sixth embodiment, because a passivation film becomes unnecessary, it is possible to reduce times of the exposure and the development to four times; accordingly it is possible to simplify the steps for manufacturing.

Because the times for using the mask patterns decrease, the displacement of mask hardly occur; as a result, it is possible to reduce a fluctuation of parasitic capacitor in the signal lines, the scanning lines and the TFTs. Accordingly, liquid crystal display devices of which a resolution and an aperture ratio are high are obtained.

Seventh Embodiment

A seventh embodiment is an example modifying the sixth embodiment. An array substrate according to the seventh embodiment has back channel type of TFTs. The uppermost layer 47c of the source electrodes and the drain electrodes of the TFTs is formed of vanadium.

As is the case with the fourth embodiment and the fifth embodiment, in the seventh embodiment, because the uppermost layer 47c of the source electrodes 48 and the drain electrodes 49 of the TFTs is formed of vanadium, it is possible to reduce a leak current flowing between the source electrodes 48 and the drain electrodes 49.

It is possible to replace Mo layer or V layer that is a uppermost layer of the source electrodes and the drain electrodes with tantalum (Ta), titanium (Ti) or tungsten (W). For instance, in case of replacing the uppermost layer 47c of the source electrodes 48 and the drain electrodes 49 with tantalum, after a Mo/Al/Ta laminated layer 47 is formed by the sputter method, unnecessary tantalum is removed by the wet etching by using a CDE or a mixed acid including acetic acid, phosphorous acid and nitric acid.

As a condition of the CDE, for instance, a gas ratio of $O_2$ and $CF_4$ is set to 1:1, and an etching time is set to 50 seconds. As a condition of the wet etching, for instance, a liquid temperature is set to 35° C., and the etching time is set to 200 seconds.

On the other hand, when the uppermost layer 47c of the source electrodes 48 and the drain electrodes 49 is titanium, after Mo/Al/Ti laminated film 47 is formed by the sputter method, the wet etching that uses an EDTA is carried out, or the wet etching that uses a mixed acid including nitric acid, acetic acid, hydrochloric acid and water is carried out.

As a condition of the etching according to the EDTA, for instance, a liquid temperature is set to 25° C., and the etching temperature is set to 125 seconds. As a condition of etching according to the mixed acid, for instance, the liquid temperature is set to 35° C., and the etching time is set to 200 seconds.

Thus, the uppermost layer 47c of the lower conductive layer of the source electrode 48 and the drain electrode 49 is formed of a material such as tantalum, titanium, or tungsten. Accordingly, it is possible to reduce the leak current between the source electrode 48 and the drain electrode 49.

What is claimed is:

1. A liquid crystal display device comprising:

a matrix-array substrate having scanning lines including gate electrode portions arranged on an insulating substrate, semiconductor films arranged on said gate electrode portions of said scanning lines via an insulated film, signal lines electrically connected to said semiconductor films via drain electrodes, source electrodes electrically connected to said semiconductor films, and display pixel electrodes electrically connected to said source electrodes;

an opposed substrate arranged so as to be opposite to said matrix array substrate; and a liquid crystal layer held between said matrix array substrate and said opposed substrate via respective alignment film, wherein each of said signal lines includes a first signal line layer and a second signal line layer deposited on said first signal line layer, said second signal line layer is formed in a same step as that of forming said display pixel electrodes and said alignment film on the matrix array substrate directly contacts at least said display pixel electrodes and said signal lines of said matrix array substrate, the first layer being mainly made of aluminum (Al) and the second layer and said display pixel electrodes being made of an ITO film which includes an alloy of indium (In), tin (T) and oxide (O), or an IZO film which includes an alloy of indium (T), zinc (Z) and oxide (O).

2. The liquid crystal display device according to claim 1, wherein more than 20% of an upper surface of said first signal line layer is covered with said second signal line layer.

3. A matrix array substrate comprising:

scanning lines including gate electrode portions arranged on an insulating substrate;

semiconductor films arranged on said gate electrode portions of said scanning lines via an insulated film;

signal lines electrically connected to said semiconductor film via drain electrodes; source electrodes electrically connected to said semiconductor film; and display pixel electrodes electrically connected to said source electrodes, wherein layers of said signal lines includes a first signal line layer mainly made of aluminum and a second line layer which is deposited on the first signal line layer and made of at least one material among tantalum (Ta), titanium (Ti), tungsten (W) and vanadium (V), and wherein an alignment film is disposed on the matrix array substrate and directly contacts at least said display pixel electrodes and said signal lines of said matrix array substrates.

4. The matrix array substrate according to claim 3, wherein said second signal line layer is made of vanadium (V).

5. The matrix array substrate according to claim 3, wherein said layers for signal lines includes a third signal line layer arranged on said second signal line layer, said third signal line layer being formed of using the same material and being formed in the same step as said display pixel electrodes.

6. A liquid crystal display device comprising:

a matrix array substrate having scanning lines including:
a gate electrode portion arranged on an insulting substrate;
semiconductor films arranged on said gate electrode portions of said scanning lines via an insulated film;
signal lines electrically connected to said semiconductor films via drain
electrodes, source electrodes electrically connected to said semiconductor films; and
display pixel electrodes electrically connected to said source electrodes;

an opposed substrate arranged so as to be opposite to said matrix array substrate; and a liquid crystal layer held between said matrix array substrate and said opposed substrate via respective alignment film, wherein each of said signal lines includes a first signal line layer and a second signal line layer deposited on said first signal line layer, said second signal line layer is made of at least one material selected among tantalum (Ta), titanium (Ti), tungsten (W) and vanadium (V), and said alignment film on the matrix array substrate directly contacts at least said display pixel electrodes and said signal lines of said matrix array substrate.

* * * * *